(12) United States Patent
Xu et al.

(10) Patent No.: US 7,810,796 B2
(45) Date of Patent: Oct. 12, 2010

(54) DEAD ZONE ACTIVATION IN VAPOR-LIQUID CONTACTING APPARATUS

(75) Inventors: Zhanping Xu, Amherst, NY (US);
Kevin A. Richardson, Hamburg, NY (US); Robert J. Miller, Houston, TX (US); Nicholas F. Urbanski, College Station, TX (US)

(73) Assignee: UOP LLC, Des Plaines, IL (US)

( * ) Notice: Subject to any disclaimer, the term of this patent is extended or adjusted under 35 U.S.C. 154(b) by 971 days.

(21) Appl. No.: 11/610,785

(22) Filed: Dec. 14, 2006

(65) Prior Publication Data

US 2008/0142355 A1 Jun. 19, 2008

(51) Int. Cl.
*B01F 3/04* (2006.01)
(52) U.S. Cl. ................. 261/114.1; 261/114.5
(58) Field of Classification Search ............... 261/114.1, 261/114.2, 114.3, 114.4, 114.5
See application file for complete search history.

(56) References Cited

U.S. PATENT DOCUMENTS

| | | | | |
|---|---|---|---|---|
| 2,274,041 A | * | 2/1942 | Cook et al. ............... | 261/114.1 |
| 2,428,922 A | * | 10/1947 | Shoresman ................. | 261/95 |
| 2,903,251 A | * | 9/1959 | Thrift ...................... | 261/114.3 |
| 3,685,811 A | | 8/1972 | Heckmann et al. ....... | 261/114 R |
| 3,759,497 A | * | 9/1973 | Black .......................... | 261/113 |
| 4,174,363 A | | 11/1979 | Bruckert ................ | 261/114 TC |
| 4,328,177 A | | 5/1982 | Trager .................. | 261/114 JP |
| 4,405,449 A | | 9/1983 | Trager ........................ | 208/350 |
| 4,808,350 A | * | 2/1989 | Robbins et al. ................ | 261/96 |
| 4,976,823 A | | 12/1990 | Davis ........................... | 202/158 |
| 5,061,407 A | | 10/1991 | Nutter ........................ | 261/96 |
| 5,192,466 A | | 3/1993 | Binkley ................... | 261/114.3 |
| 5,454,989 A | * | 10/1995 | Nutter ..................... | 261/114.1 |
| 5,468,425 A | | 11/1995 | Nutter ..................... | 261/114.3 |
| 5,547,617 A | | 8/1996 | Lee et al. .................. | 261/114.5 |
| 5,632,935 A | | 5/1997 | Yeoman et al. .......... | 261/114.1 |
| 5,788,895 A | * | 8/1998 | Altinger et al. .......... | 261/114.5 |
| 6,003,847 A | | 12/1999 | Lee et al. .................. | 261/114.1 |
| 6,053,484 A | | 4/2000 | Fan et al. .................. | 261/114.1 |
| 6,068,244 A | | 5/2000 | Burton et al. ............. | 261/114.4 |
| 6,086,055 A | | 7/2000 | Armstrong et al. ............ | 261/96 |
| 6,095,504 A | | 8/2000 | Heldwein et al. ......... | 261/114.5 |
| 6,113,079 A | | 9/2000 | Urbanski et al. .......... | 261/114.5 |
| 6,116,583 A | | 9/2000 | Agnello .................... | 261/114.1 |
| 6,131,891 A | | 10/2000 | Resetarits et al. ......... | 261/114.1 |
| 6,267,359 B1 | | 7/2001 | Stippick .................. | 261/114.5 |
| 6,629,687 B1 | | 10/2003 | Gage ........................ | 261/114.5 |
| 6,749,182 B1 | | 6/2004 | Larson et al. .................. | 261/97 |
| 6,799,752 B2 | | 10/2004 | Wu et al. .................. | 261/114.2 |
| 6,830,607 B2 | | 12/2004 | Allen et al. ..................... | 95/263 |
| 6,962,661 B2 | | 11/2005 | Northup, Jr. et al. ........ | 210/634 |
| 7,235,158 B2 | * | 6/2007 | Matsumoto et al. ............ | 203/8 |
| 7,347,413 B2 | * | 3/2008 | Diefenbacher et al. ... | 261/114.1 |

* cited by examiner

*Primary Examiner*—Scott Bushey
(74) *Attorney, Agent, or Firm*—Mark Goldberg (57) ABSTRACT

The invention involves a spacing element situated between a vapor-liquid contacting tray and a tray support to reduce the dead zone typically caused by the tray supports blocking of the perforations in the vapor-liquid contacting tray directly above the tray support.

15 Claims, 8 Drawing Sheets

PRIOR ART

FIG. 1A

PRIOR ART

FIG. 1B

PRIOR ART

DEAD ZONE ACTIVATION IN VAPOR-LIQUID CONTACTING APPARATUS

FIELD OF THE INVENTION

This invention relates to vapor-liquid contacting apparatus for mass or heat transfer and specific features that improve the efficiency and capacity of this operation. The invention therefore relates to, for example, apparatus used as fractionation trays within fractional distillation columns. The invention may also be used in a variety of other gas-liquid contacting operations such as stripping or absorption processes.

BACKGROUND OF THE INVENTION

Vapor-liquid contacting devices are used in a wide variety of applications for separating liquid or vapor mixtures. One of the major applications of the vapor-liquid contacting devices is in the separation of chemical compounds via fractional distillation. These devices are also used to contact a gas stream with a treating liquid which selectively removes a product compound or an impurity from the gas stream.

Within a column containing vapor-liquid contacting devices, liquid flows in a generally downward direction and vapor rises vertically through the column. On each vapor-liquid contacting device, liquid flows in a generally horizontal direction across the device and vapor flows up through perforations on the device. The cross flow of vapor and liquid streams on each device generates a froth for intimate vapor-liquid contacting and mass transfer.

The apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquefied petroleum gas), naphtha or kerosene. The chemical compounds separated with the subject apparatus are not limited to hydrocarbons but may include any compound having sufficient volatility and temperature stability to be separated by fractional distillation. Examples of these materials are acetic acid, water, acetone, acetylene, styrene acrylonitrile, butadiene, cresol, xylene, chlorobenzenes, ethylene, ethane, propane, propylene, xylenols, vinyl acetate, phenol, iso and normal butane, butylenes, pentanes, heptanes, hexanes, halogenated hydrocarbons, aldehydes, ethers such as MTBE and TAME, and alcohols including tertiary butyl alcohol and isopropyl alcohol.

One important issue in the field of vapor-liquid contacting columns is improving the capacity and mass transfer efficiency of the trays. By improving capacity and mass transfer efficiency smaller columns may be used or less trays may be needed to achieve a similar result.

Supports are necessary to keep the vapor-liquid contacting tray in position. However, the perforations on the vapor-liquid contacting trays above the support are blocked by the support and no vapor can pass through these areas. Therefore, the zones above the support become dead zones in which little or no vapor-liquid contact occurs, reducing the active area of the tray. Tray capacity is reduced when a significant amount of active tray area is blocked by support means. Tray efficiency is also decreased since little vapor-liquid contact occurs in the dead zones.

Within a vapor-liquid contacting column, a support ring is attached to the inside perimeter of the column wall to provide support for a vapor-liquid contacting tray. The vapor-liquid contacting tray generally rests on the support ring, and the support ring creates a dead zone around the perimeter of the vapor-liquid contacting tray. Additionally, for large trays a support beam, such as a flange or I-beam, is attached to the support ring or column wall, and may be utilized to provide additional support for a vapor-liquid contacting tray. Similarly, the area of the vapor-liquid contacting tray directly above the support beam becomes a dead zone due to the blockage of vapor flow to that particular area of the vapor-liquid contacting tray.

Traditionally vapor-liquid contacting trays are affixed to a tray support ring for support. The tray support ring blocks a large amount of the active area of the tray. A vapor-liquid contacting column with an internal diameter of 2.44 meters (8 feet) possesses an internal cross-sectional area of about 4.68 square meters (50 square feet). The tray support ring with a width of 7.62 cm (3 inches) reduces the active cross-sectional area to about 4.10 square meters (44 square feet), a reduction of about 12%. This reduction does not include other contributors to dead zones such as beam supports, downcomer angles, splice angles or downcomer end support plates.

To reduce the amount of dead zone area, holes may be manually drilled into the support means to activate a portion of the dead zone. However, this method is inconsistent with the initial design of the vapor-liquid contacting tray as the manually drilled holes often vary in size, angle, pitch and location. Additionally, vapor-liquid contacting trays may have shaped holes or louvers as to accelerate liquid flow, or control vapor flow in a particular manner that manually drilled holes would not replicate. Furthermore, drilling holes into the support compromises the integrity of the support, potentially creating a need for additional support means.

U.S. Pat. No. 6,799,752 issued to Wu et al. on Oct. 5, 2004, discloses a method for activating tray dead zones such as those above major support beams by installing microdispersers on the dead zones. However, these microdispersers may interfere with liquid flow when they are installed perpendicular to the liquid flow. The microdispersers may also reduce available space for liquid/froth flow across the microdispersers when the support beams are aligned vertically one above another.

Therefore, an apparatus that can adequately support vapor-liquid contacting trays while increasing the active cross-sectional area of the tray by reducing dead zones without impeding liquid flow is desired.

SUMMARY OF THE INVENTION

The invention comprises a spacing element situated between a vapor-liquid contacting tray and a tray support to increase the active area of the vapor-liquid contacting tray. By increasing the active area of the vapor-liquid contacting tray the capacity and mass transfer efficiency of the vapor-liquid contacting tray is increased. The spacing element is situated such that a portion of the perforations in the vapor-liquid contacting tray that are directly above the tray support are active perforations. An increased portion of the vapor-liquid contacting tray can therefore be activated, reducing the amount of dead zones and increasing the overall capacity and mass transfer efficiency of the vapor-liquid contacting tray.

An advantage of the present invention is that the capacity of a vapor-liquid contacting tray is increased. A further advantage of the present invention is that the mass transfer efficiency of a vapor-liquid contacting tray is improved. This is done by elevating the vapor-liquid contacting tray above the tray support, reducing the dead zone areas across the vapor-liquid contacting tray, and increasing the active area.

BRIEF DESCRIPTION OF THE DRAWINGS

The present invention is disclosed with reference to the accompanying drawings, wherein:

FIGS. 6A through 9B are schematic views various spacing elements according to a first embodiment of the present invention;

Corresponding reference characters indicate corresponding parts throughout the several views. The examples set out herein illustrate several embodiments of the invention but should not be construed as limiting the scope of the invention in any manner.

DETAILED DESCRIPTION

Figure 1A:
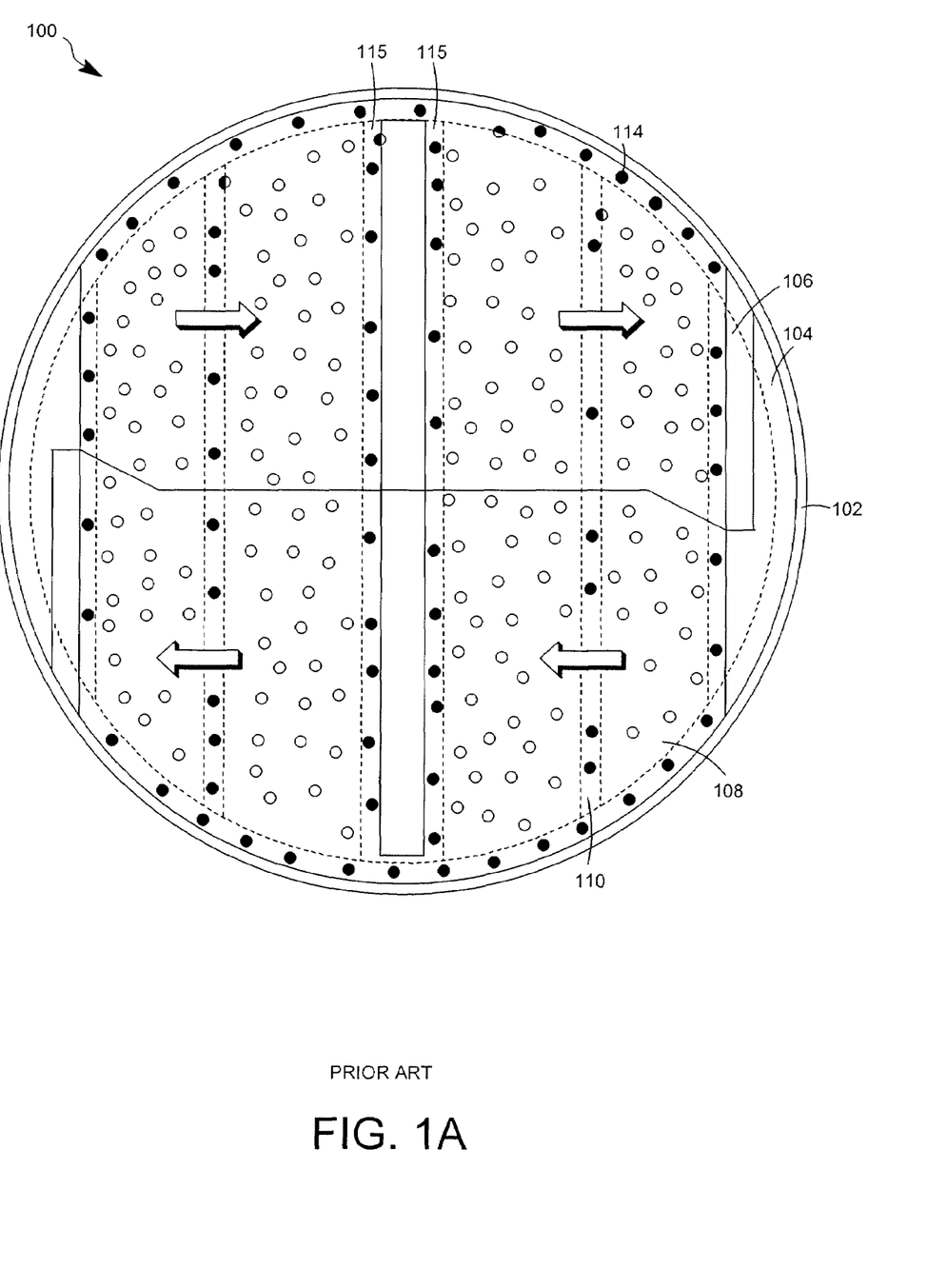
FIGS. 1A through 1C are schematic views of a vapor-liquid contacting tray supported by a support ring and support beams according to the prior art.
Figure 1B:
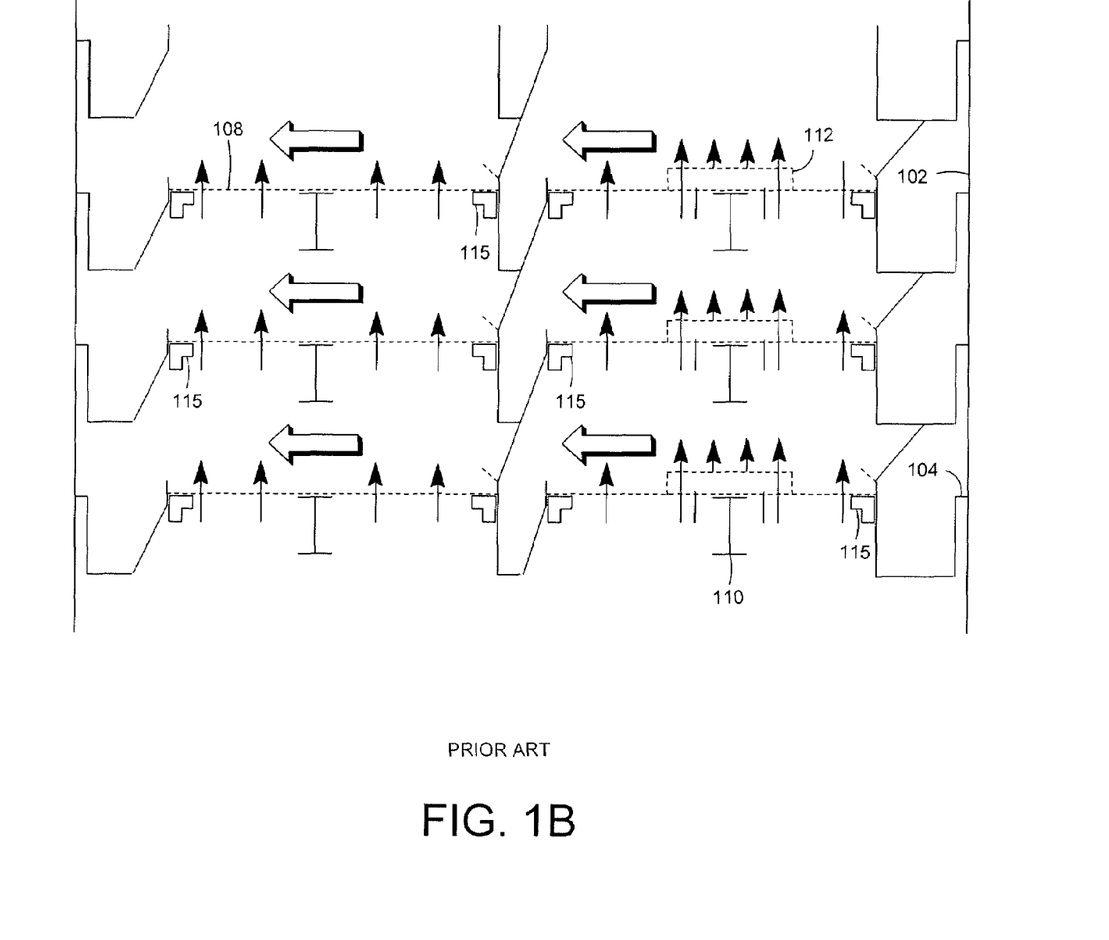
Figure 1C:
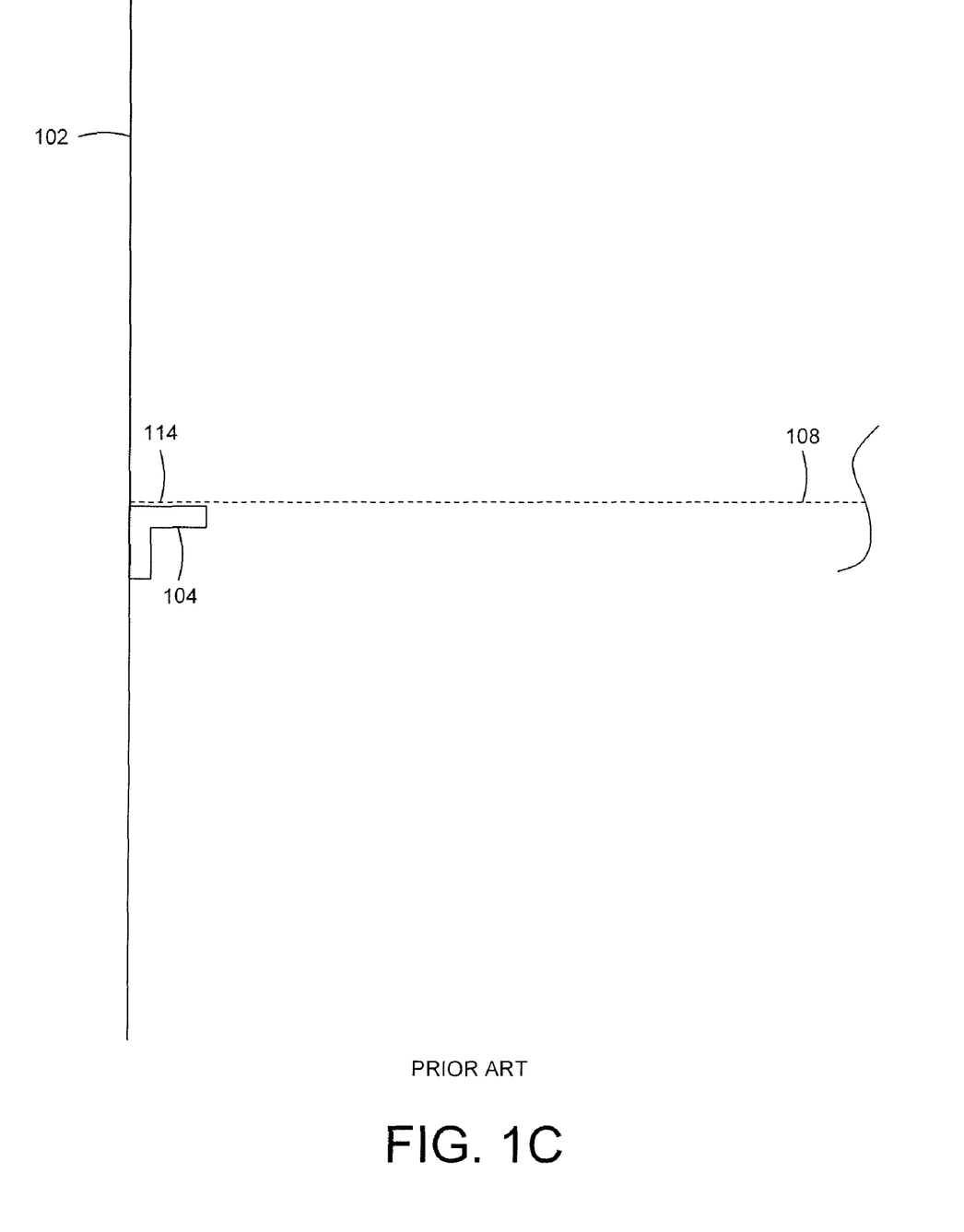

Referring to FIGS. 1A through 1C, there is shown a section of vapor-liquid contacting column 100 according to the prior art. A support ring 104 is attached to the inner surface of the column wall 102. The vapor-liquid contacting tray 108 is bolted, clamped or otherwise affixed to a tray support in order to be kept in position during operation. The tray support can be either the support ring 104 or a combination of the support ring 104 with additional support beams 110. The vapor-liquid contacting tray 108 includes perforations 114 to allow vapor to flow through the vapor-liquid contacting tray 108 and contact the liquid on the vapor-liquid contacting tray 108 creating a froth on the tray for mass transfer. The perforations 114 directly above the support ring 104, support beams 110 and downcomer angle 115 are blocked by these structures, and thus create dead zones. The capacity and mass transfer efficiency of the vapor-liquid contacting tray can be increased by reducing the amount of dead zone area. A microdisperser 112 can be installed above the support beam 110 to increase the active area of the tray. However, the microdisperser 112 interferes with liquid flow and reduces the available space for liquid/froth flow between a microdisperser 112 and a support beam above the vapor-liquid contacting tray 108.

Referring to FIG. 1C, there is shown a section of a vapor-liquid contacting column 100 according to the prior art. A support ring 104 is attached to the inner surface of the column wall 102. The vapor-liquid contacting tray 108 is bolted, clamped or otherwise affixed to the support ring 104 as to be kept it in position during operation. The perforations 114 directly above the support ring 104 are blocked by the support ring 104 creating a dead zone on the vapor-liquid contacting tray 108.

Referring to FIGS. 2-5, there is shown a first embodiment of the present invention which raises a vapor-liquid contacting tray above the supports. A spacing element 316 is situated between the support beam 310 and the vapor-liquid contacting tray 308 to create a gap for additional vapor flow, effectively reducing the dead zone area.

The vapor-liquid contacting tray 308 is perforated with perforations 314 to allow vapor to flow through the vapor-liquid contacting tray 308 and contact the liquid on the vapor-liquid contacting tray 308. The perforations 314 may be any shape or size hole or slot; or any other device known in the art, including valves or bubble caps, that allow vapor passage. In general, the number and size of perforations are chosen to be small enough to avoid excessive liquid flow down through the perforations, and large enough to avoid any excessive pressure drop.

Figure 3:
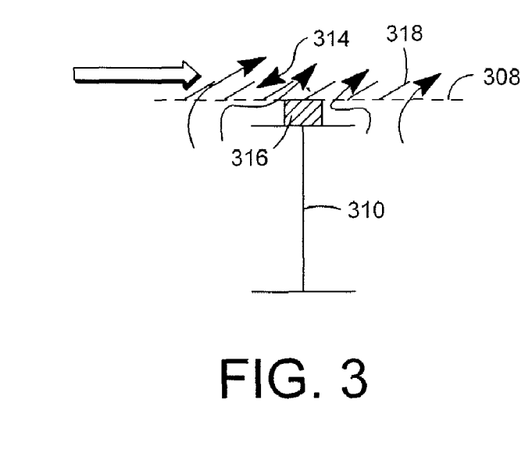
FIG. 3 is a schematic view of a vapor-liquid contacting tray having louvers according to a first embodiment of the present invention.

Vertical space for froth movement may be decreased due to the support beams of superior vapor-liquid contacting trays; vapor-directing slots 318 can encourage froth to move through these smaller spaces. The perforations may take many forms including spaced, circular holes or vapor-directing slots 318 such as louvers. The vapor-directing slots 318 are oriented such that the vapor rising upward through the vapor-liquid contacting tray 308 through these vapor-directing slots 318 imparts a horizontal thrust or momentum to the liquid or froth above the vapor-liquid contacting tray 308. There is therefore achieved a decrease in the froth height and a more rapid passage of the froth across the areas above the support beams 310 on the vapor-liquid contacting tray 308. These vapor-directing slots 318 and their function may resemble those described in U.S. Pat. No. 4,499,035 issued to Kirkpatrick et al., which is incorporated herein by reference. U.S. Pat. No. 3,417,975 issued to Williams et al. provides representations of a portion of decking material having both circular perforations and flow directing slots. This patent is also incorporated herein for its teaching as to the design and usage of flow directing slots.

Figure 2:
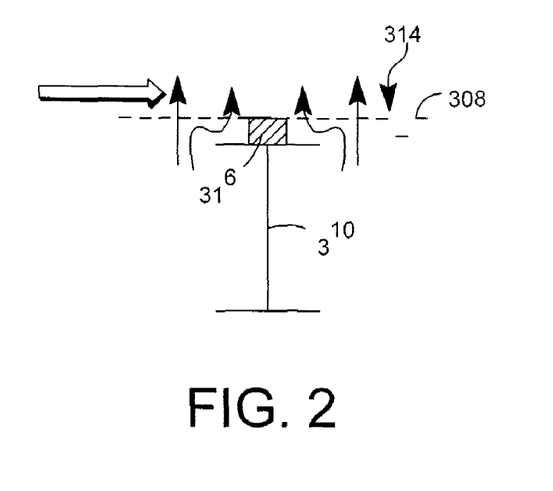
FIG. 2 is a schematic view of a spacing element situated between a support beam and a vapor-liquid contacting tray according to a first embodiment of the present invention.

The spacing element 316 elevates the vapor-liquid contacting tray 308 above the support beam 310 to activate a large portion of the perforations 314 directly above the support beam 310. The gap created by the spacing element is sufficient to activate the perforations 314 above the support beam 310. In one particular embodiment, a gap between the bottom surface of the vapor-liquid contacting tray and the upper surface of the tray support between about 0.64 cm (0.25 inches) and 6.35 cm (2.50 inches) is used. In a further particular embodiment, at least about 50% of the perforations directly over the tray support are active perforations. In another particular embodiment, at least about 70% or the perforations directly over the tray support are active perforations.

Figure 4:
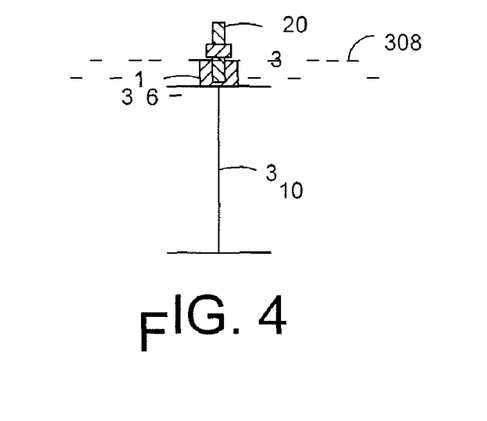
FIG. 4 is a schematic view of a clamping element securing a vapor-liquid contacting tray to a spacing element according to a first embodiment of the present invention.
Figure 5:
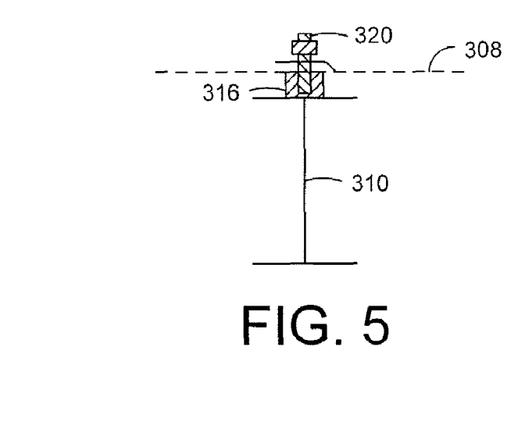
FIG. 5 is a schematic view of a clamping element securing multiple vapor-liquid contacting trays to a spacing element according to a first embodiment of the present invention.
Figure 6A:
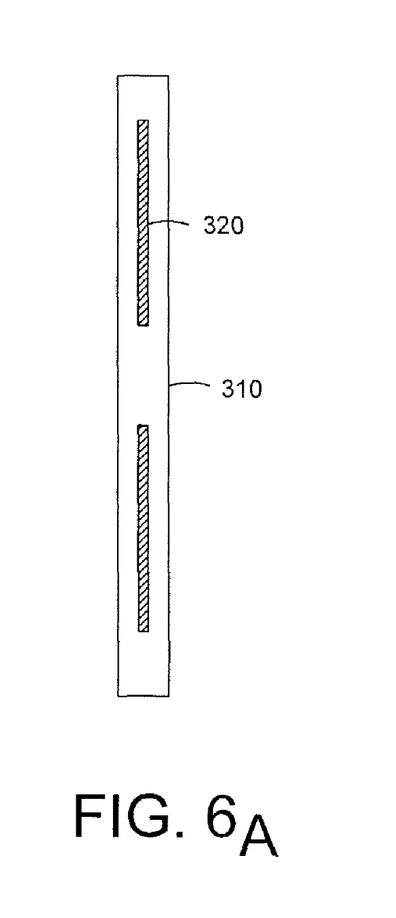
Figure 6B:
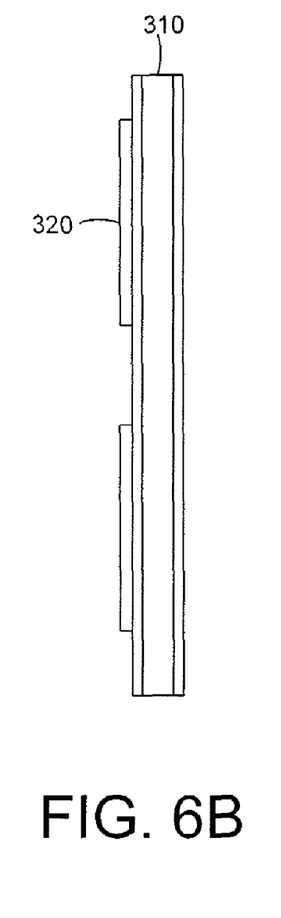
Figure 7A:
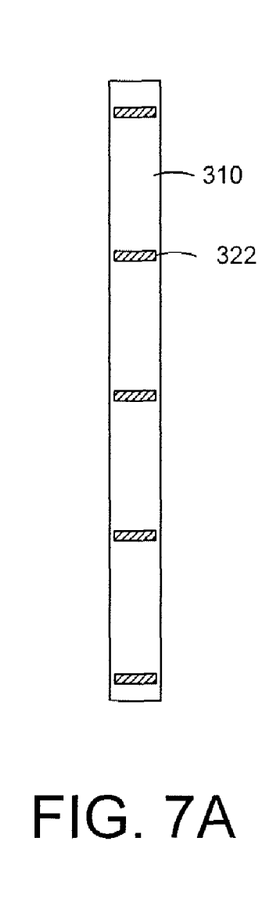
Figure 7B:
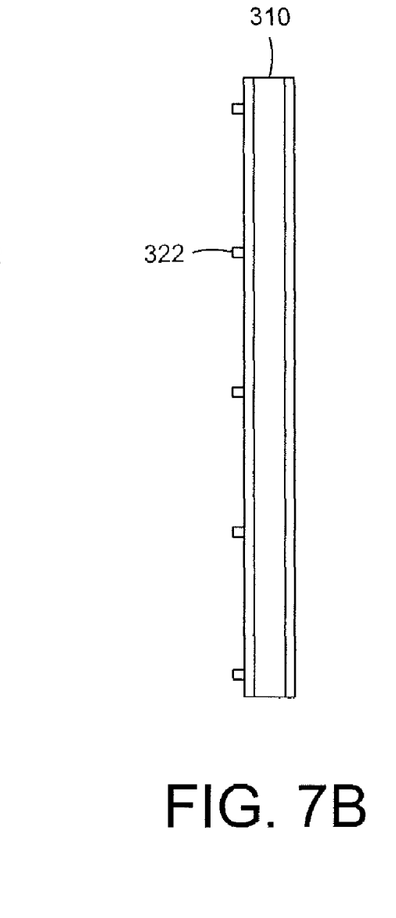
Figure 8A:
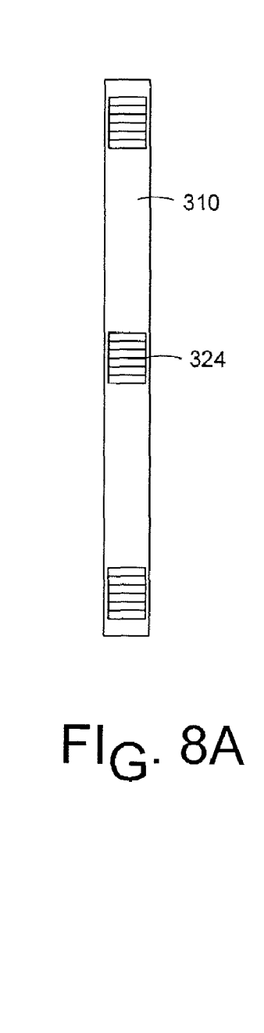
Figure 8B:
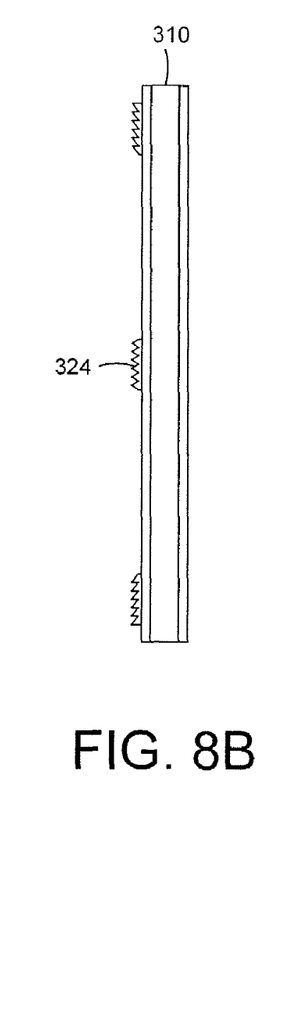

Referring to FIG. 4, a fastener 320 is attached to the spacing element 316 to keep the vapor-liquid contacting tray 308 in position. Referring to FIG. 5, a fastener 320 is attached to the spacing element 316 to keep two pieces of the vapor-liquid contacting tray 308 in position. It is understood that numerous pieces of the vapor-liquid contacting tray may be joined by any number of fasteners attached to the same or distinct spacing elements.

Figure 9A:
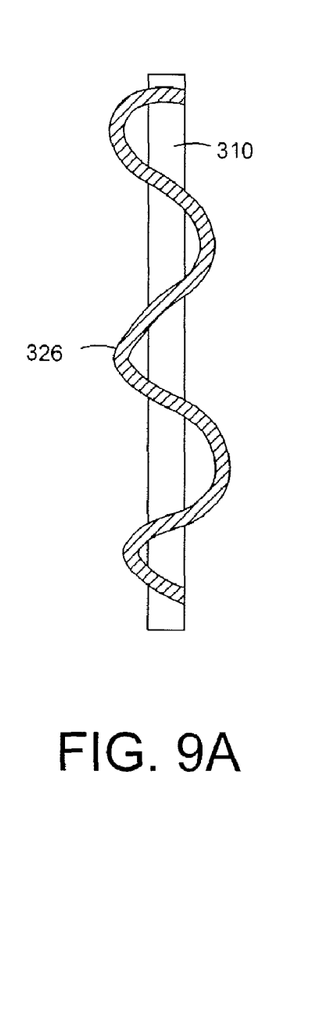
Figure 9B:
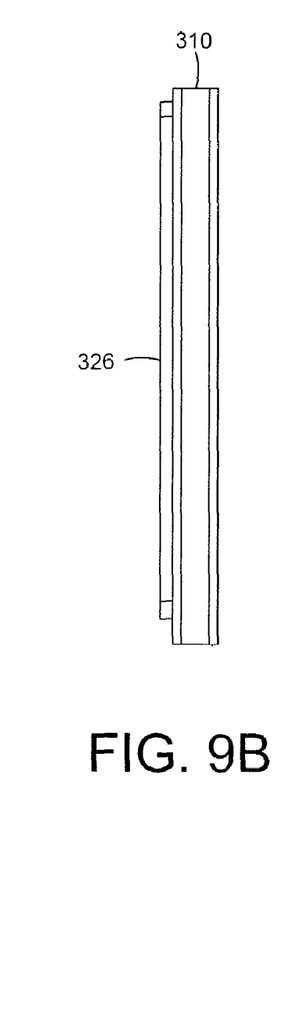

FIGS. 6A through 9B show spacing elements attached to the upper surface of the support beam 310. The spacing elements may take numerous shapes such as, but not limited to, a longitudinal spacing element 320 having a width significantly less than the width of the support beam 310, a transverse spacing element 322 arranged in discrete portions along the support beam 310, a corrugated spacing element 324 that reduces the total contact area with the vapor-liquid contacting tray, not shown, or a shaped spacing element 326 strategically designed to minimize the number of perforations (not shown) obstructed by the shaped spacing element 326. Alternatively, shaped spacing element 326 can comprise additional designs such as linear sections with vertices as opposed to curved sections as shown in FIG. 9. Spacing elements may additionally be perforated to allow additional vapor flow activating additional perforations in the vapor-liquid contacting tray. Furthermore, spacing elements may be of any geometric shape such as; rectangular, circular or triangular and may be oriented in discrete sections along the tray support to activate additional perforations between the discrete sections.

It is understood that the spacing elements may be placed on the support ring, the downcomer angle, or the support beams and be of any shape or design which reduces obstruction of perforations. Additionally, support beams may be situated in any orientation below the vapor-liquid contacting tray.

Figure 10A:
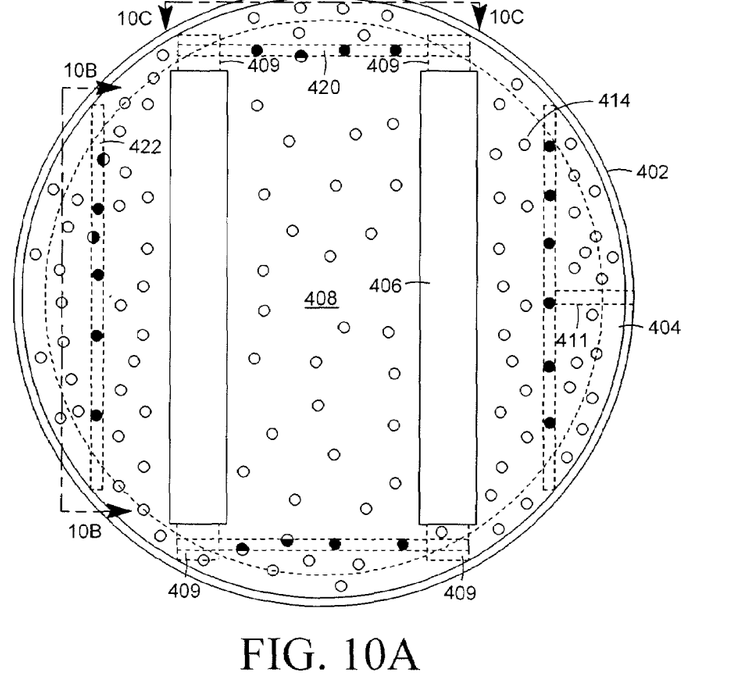
FIGS. 10A, 10B and 10C are schematic views of a vapor-liquid contact tray situated between a support ring and a vapor-liquid contacting tray according to a second and third embodiment of the present invention.
Figure 10B:
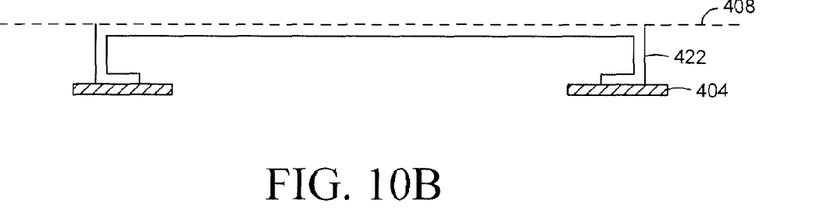
Figure 10C:
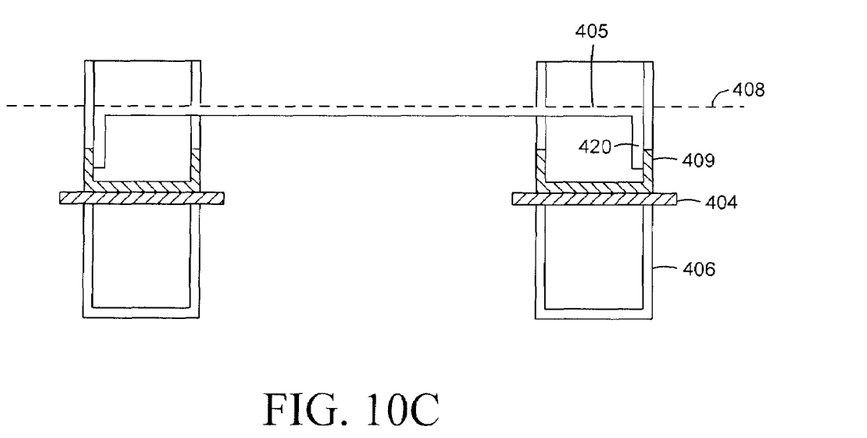

Referring to FIGS. 10A-10C, two alternative embodiments are shown to raise the vapor-liquid contacting tray above the supports. In the second embodiment of the present invention, spacing element 422 is affixed to the support ring 404 such that the vapor-liquid contacting tray 408 is elevated above the support ring 404, thus activating a large portion of the perforations 414 directly above the support ring 404. Although spacing element 422 may create new dead zones by blocking some perforations 414 on the vapor-liquid contacting tray 408 that are not above the support ring 404, the total active area of the vapor-liquid contacting tray 408 is greater than if the vapor-liquid contacting tray 408 rested directly on the support ring 404. Additional support means 411 for spacing element 422 may be extended to the downcomer 406, the column wall 402 or the support ring 404 so as to provide additional rigidity to the spacing element 422 or vapor liquid contacting tray 408. In one particular embodiment, a gap between the bottom surface of the vapor-liquid contacting tray and the upper surface of the tray support between about 0.64 cm (0.25 inches) and 6.35 cm (2.50 inches) is used. In a further particular embodiment, at least about 50% fewer perforations are blocked than if the vapor-liquid contacting tray rested directly on the support means. In an additional particular embodiment, at least about 70% fewer perforations are blocked than if the vapor-liquid contacting tray rested directly on the support means.

In the third embodiment of the present invention, a movable support plate 409 is affixed to the support ring 404, and provides support for the downcomer 406. The movable support plate 409 is easily movable so as to simply adjust the elevation of the downcomer 406. This may be accomplished by numerous means such as utilizing elliptical shaped fastening holes in the movable support plate 409, in which fastening means such as a bolt may pass through allowing for easy adjustments. A U-shaped support bridge 420 is affixed to the movable support plate 409 to support the vapor-liquid contacting tray 408 above the support ring 404, thus activating a large portion of the perforations 414 directly above the support ring 404. Elevating the contacting tray 408 leaves an empty space between the downcomer 406 and the wall of the column that would otherwise be taken up by the movable support plate 409. A perforated end plate insert 405 may be inserted into this space to provide an additional active area for vapor-liquid contact and to prevent liquid from passing to a lower tray outside the downcomer. Additionally, a sliding deck piece may be utilized to reduce any gap between the vapor-liquid contacting tray 408 and the inner surface of the column wall 402 to limit liquid from passing to a lower tray outside the downcomer as described by U.S. Pat. No. 6,113,079, issued to Urbanski et al., which is incorporated herein by reference. In addition to the spacing elements shown, it is understood that any suitable design for spacing elements may be utilized, such as C-channel spacing elements. In one particular embodiment, at least about 50% fewer perforations are blocked than if the vapor-liquid contacting tray rested directly on the support means. In an additional particular embodiment, at least about 70% fewer perforations are blocked than if the vapor-liquid contacting tray rested directly on the support means.

It is understood that for larger vapor-liquid contacting trays additional support beams may be necessary. Additional support beams may incorporate spacing elements as disclosed in any of the above embodiments of the present invention or combinations thereof.

Figure 11:
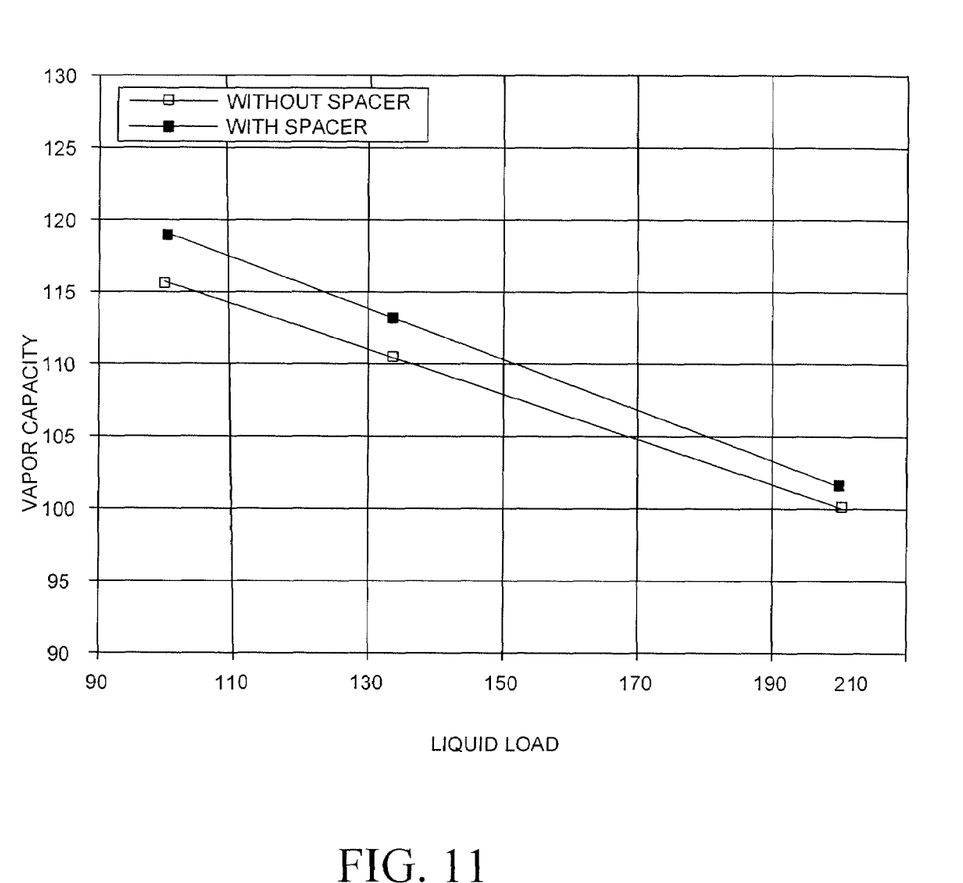
FIG. 11 is a graphical representation showing the improved vapor capacity of the present invention over the prior art.

Referring to FIG. 11, there is shown the test results from an 2.44 meter (8-foot) pilot column. An I-beam was used in the tests with 10.16 cm (4-inch) wide top flange. The first test was conducted with the I-beam supporting the tray directly. The second test was conducted with a 1.27 cm (0.5-inch) gap between the tray and the I-beam as shown in FIG. 2. The 1.27 cm (0.5-inch) gap was created by use of two spacing elements with dimensions of 2.54×1.27×60.96 (width×height×length, all in cm) (1.0×0.5×24 inches) installed on the top of the beam similar to that shown in FIGS. 6A and B. The tests show that the tray with the spacing element shows higher capacity than the one without the gap at all test conditions.

It is understood that numerous spacing elements may be used to support a vapor-liquid contacting tray, and that a variety of differing designs may be employed in a single application. Furthermore, spacing elements may attach to the downcomer, downcomer angles, support means, the column wall, or any combination thereof.

It is further understood that although particular vapor-liquid contacting trays have been shown and described in the above embodiments, the invention may be utilized in any style of vapor-liquid contacting tray requiring a support means. Furthermore, the invention may be utilized in conjunction with any type of vapor-liquid contacting tray support.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. An apparatus for use within a vapor-liquid contacting column comprising:
   a. a tray support;
   b. a vapor-liquid contacting tray situated above said tray support, wherein said vapor-liquid contacting tray comprises a plurality of perforations, and is the most proximate vapor-liquid contacting tray above said tray support; and
   c. a spacing element situated between said vapor-liquid contacting tray and said tray support, wherein said spacing element is situated such that a portion of the perforations directly above said tray support are active perforations and wherein said spacing element comprises corrugated sections and wherein said corrugated sections are perforated.

2. The apparatus of claim 1 wherein at least about 50% of the perforations directly above said tray support are active perforations.

3. The apparatus of claim 1 wherein at least about 70% of the perforations directly above said tray support are active perforations.

4. The apparatus of claim 1 wherein a surface area of said spacing element in contact with said vapor-liquid contacting tray is less than an upper surface area of said tray support.

5. The apparatus of claim 1 wherein an upper surface of said tray support contacts a lower surface of said spacing element, and an upper surface of said spacing element contacts a lower surface of said vapor-liquid contacting tray.

6. The apparatus of claim 1 wherein said spacing element comprises discrete portions situated on said tray support.

7. The apparatus of claim 1 wherein a bottom surface of said vapor-liquid contacting tray is between about 0.64 cm (0.25 inches) and about 6.35 cm (2.50 inches) above an upper surface of said tray support.

8. The apparatus of claim 1 further comprising a fastener connecting said vapor-liquid contacting tray to said spacing element.

9. An apparatus for use within a vapor-liquid contacting column comprising:
   a. a tray support;
   b. a vapor-liquid contacting tray situated above said tray support, wherein said vapor-liquid contacting tray comprises a plurality of perforations, and is the most proximate vapor-liquid contacting tray above said tray support; and
   c. a spacing element situated between said vapor-liquid contacting tray and said tray support, wherein said spacing element is situated such that a portion of the perforations directly above said tray support are active perforations, wherein said tray support is a support ring proximate to an outer perimeter of said vapor-liquid contacting tray and wherein said spacing element comprises a U-shaped support bridge.

10. A vapor-liquid contacting column comprising:
   a. a column wall;
   b. a tray support affixed to an inner surface of said column wall;
   c. at least one vapor-liquid contacting tray situated above said tray support and within the inner surface of said column wall, wherein said vapor-liquid contacting tray comprise a plurality of perforations, and is the most proximate vapor-liquid contacting tray above said tray support; and
   d. a spacing element situated between said tray support and said vapor-liquid contacting tray, wherein said spacing element is situated such that a portion of the perforations directly above said tray support are active perforations, and wherein said spacing element is connected to a downcomer support.

11. The apparatus of claim 10 wherein at least about 50% of the perforations directly above said tray support are active perforations.

12. The apparatus of claim 10 wherein a surface area of said spacing element in contact with said vapor-liquid contacting tray is less than an upper surface area of said tray support.

13. The apparatus of claim 10 wherein an upper surface of said tray support contacts a lower surface of said spacing element, and an upper surface of said spacing element contacts a lower surface of said vapor-liquid contacting tray.

14. The vapor-liquid contacting column of claim 10 wherein a bottom surface of said vapor-liquid contacting tray is between about 0.64 cm (0.25 inches) and about 6.35 cm (2.50 inches) above an upper surface of said tray support.

15. The vapor-liquid contacting column of claim 10 further comprising a fastener connecting said vapor-liquid contacting tray to said spacing element.

* * * * *